United States Patent [19]

Freese

[11] Patent Number: 4,624,616
[45] Date of Patent: Nov. 25, 1986

[54] PALLET DISPENSER

[76] Inventor: Milan W. Freese, 925 18th St. SW., Cedar Rapids, Iowa 52404

[21] Appl. No.: 791,034

[22] Filed: Oct. 24, 1985

Related U.S. Application Data

[63] Continuation-in-part of Ser. No. 582,990, Feb. 24, 1984, abandoned.

[51] Int. Cl.⁴ .............................................. B65G 59/06
[52] U.S. Cl. .................................... 414/129; 221/251; 221/259; 414/113
[58] Field of Search ...................... 221/251, 259, 260; 414/101, 113, 126, 128, 129

[56] References Cited

U.S. PATENT DOCUMENTS 3,135,424 6/1964 Peppler ............................ 221/251 X
3,606,953 9/1971 Beninger et al. ................. 414/82 X

FOREIGN PATENT DOCUMENTS 1260216 3/1961 France ................................. 414/129

Primary Examiner—Leslie J. Paperner
Assistant Examiner—Janice Krizek
Attorney, Agent, or Firm—Allan L. Harms

[57] ABSTRACT

Apparatus for storing and handling pallets is disclosed. A vertical housing capable of holding pallets in a vertical stack is equipped with openings to receive stacks of pallets and discharge pallets singly. Vertically arranged wheels are provided on opposing sidewalls of the housing which compress when pallets pass between them. The wheels are ganged to incrementally rotate on a selective basis, opposing wheels rotating in opposite directions. Incremental rotation of the wheels dispenses pallets from the bottom of the stack. Straightening bars which are driven toward the interior of the housing tend to keep the pallets in stack alignment. A ram discharges dispensed pallets from the housing.

5 Claims, 6 Drawing Figures

PALLET DISPENSER

This application is a continuation-in-part of application Ser. No. 582,990, filed Feb. 24, 1984, now abandoned.

BACKGROUND OF THE INVENTION

The present invention pertains to dispensing and storage devices for empty pallets.

The handling of empty pallets has been largely a matter of manual labor in warehouses where empty pallets are stored in stacks and then distributed on a single or small number basis. In that situation, the worker needing a pallet must remove the pallet from the stack, and if using a pallet truck, the worker must deposit it on the floor to pick it up on the forks of the truck. Therefore, a worker with a riding pallet truck must dismount the truck, pull a pallet from the pallet stack and place it on the floor, remount the truck and collect the pallet. Of course, the pallets must not be stacked higher than the worker can safely reach. Previous attempts of pallet handling have been directed to the dispensing of pallets to a conveyor operation or to the loading of pallets. Some devices dispense individual pallets from a stack with star wheels, pawls, spoke wheels, or forks, as control devices. Each of these dispensing mechanisms requires heavy duty specially machined parts, precision control of dispensing rotation, as well as a properly aligned stack of pallets. The alignment of the stack typically presents a problem because pallets are not precision manufactured parts, they are handled roughly in day-to-day use, and are made of serviceable, if not polished, materials. In order to be properly dispensed, the alignment of the stack must be obtained. Alignment and dispensing of pallets frequently has required the use of complicated and expensive machinery requiring carefully and frequent calibration and maintenance. Frequently automation is involved with such machinery, thus adding to the expense, complexity and skill needed to operate and maintain the machine.

SUMMARY OF THE INVENTION

The present invention provides a pallet stacking bin which provides general alignment of pallets upon their entry into the bin. The invention also provides selective control of pallets to be dispensed from the bin, as well as an optional discharge mechanism for ejectment of a pallet from the bin area. A stack straightening mechanism is provided to assist in effective dispensing of the lower most pallet of the stack. An open sided elongated housing is provided equipped with a flared housing opening. The housing is large enough to receive a vertical stack of pallets in approximate alignment, carried by a forklift truck. Resilient wheels in sets are provided in the opposing sidewalls of the housing. Said wheels are mounted vertically and are selectively rotated in concert, toward the bottom of the housing. The common axle of each set of wheels is equipped with a plurality of non-circular plates, the corners of which engage pivoted bars during portions of the rotation of the axle. The engagement of the pivoted bars by the corners of the non-circular plates effectuates the encroachment of said bars into the pallet containing space of the housing. Said bars are fixed to the sidewalls of the housing at the upper ends of said bars with the lower ends of said bars free to move from a position essentially coplanar with the sidewall to a position within the housing. An optional ram is provided at the bottom rear of the housing which at rest is retracted outside of the pallet containing portion of the housing. The ram may be selectively operated to deliver a pallet resting on the floor of the housing from the open side of the housing and, if desired, onto the fork of a pallet truck.

It is an objective of the invention to provide an automatic pallet handling device which selectively dispenses single pallets from a large stack.

It is a further objective of the invention to provide a pallet storage housing which will receive pallets in stacks that are not in good alignment.

It is a further objective of the invention to provide a pallet dispensing storage apparatus which will automatically align pallets remaining in the stack upon the dispensing of a pallet.

It is a further objective of the invention to provide a pallet dispensing mechanism which delivers a pallet onto the fork of a waiting pallet truck.

It is a further objective of the invention to provide apparatus to allow a pallet truck operator to obtain a single pallet froa a tall stack and load it onto the forks of the operator's pallet truck without leaving the pallet truck.

It is a further objective of the invention to provide a pallet dispensing apparatus which may be operated by a single, simple control.

It is a further objective of the invention to provide a pallet dispensing apparatus available at low cost with low maintenance costs and repairable with readily available materials and parts.

It is a further objective of the invention to provide a pallet handling apparatus having simplicity of design which is economical in installation and operation, which may be easily incorporated in an existing warehousing operation, which does not require substantial additional training for the employees of the warehouse and which is compact and economical in space consumption.

These objectives and others will become readily apparent from the ensuing description of the invention.

DETAILED DESCRIPTION OF THE INVENTION

Figures 1, 4, 5:
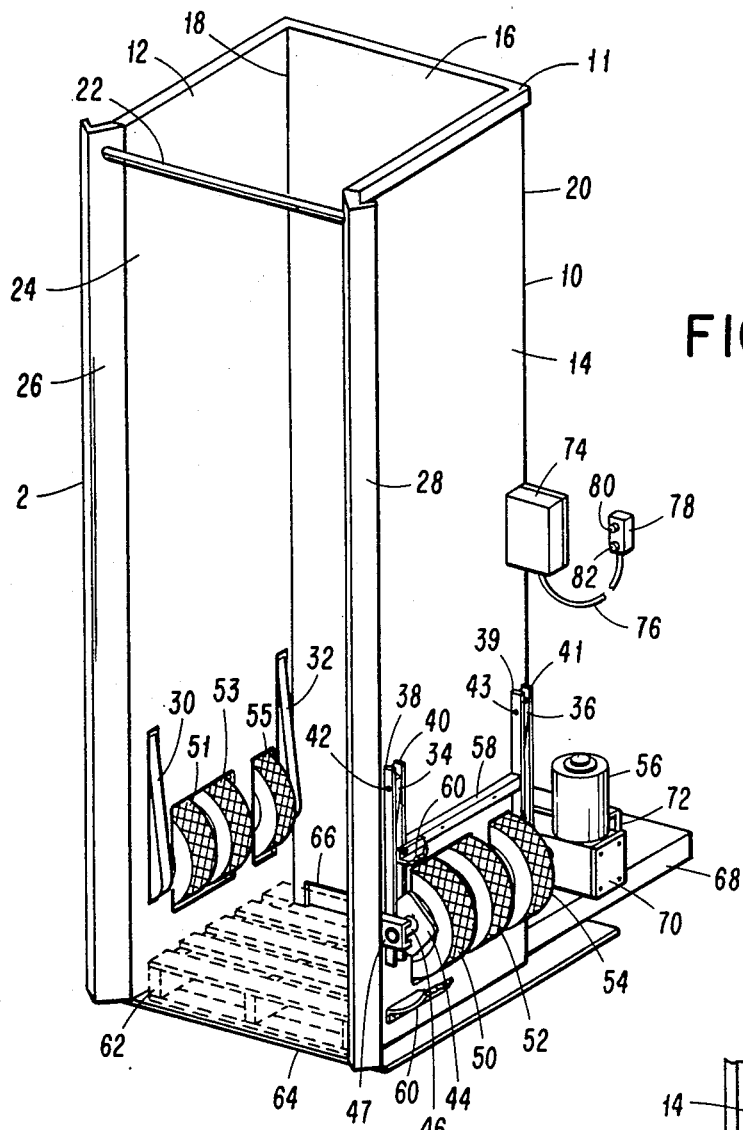
FIG. 1 is a perspective view of the invention showing the anticipated position of a pallet ready to be collected from the invention.
FIG. 4 is a right side view partially in section showing the pallet discharge mechanism and the pallet handling truck available to collect the discharged pallet.
FIG. 5 is a rear view showing the driving mechanism of the invention.

FIG. 1 discloses the preferred embodiment of the invention 2 in a perspective view. Housing 10 is a vertical enclosure with an opening provided to receive pallets. In the preferred embodiment, the opening is provided in housing 10 by excluding one wall. Housing 10 is generally symmetrical. Opposing sidewalls 12 and 14 join rear sidewall 16 at corners 18 and 20 respectively. Support 22 is provided to stabilize sidewalls 12 and 14. Cover 11 rests atop sidewalls 12 and 14, and atop rear sidewall 16. Opening 24 is sufficiently large so that housing 10 may receive pallets, or stacks thereof, in horizontally arranged fashion. Sidewalls 12 and 14 are equipped with guides 26 and 28 respectively, at opening 24. Guides 26 and 28 comprise angled extensions of sidewalls 12 and 14 respectively, and serve to generally align a stack of pallets being inserted into housing 10. Rails 38 and 40 are fixed to sidewall 14. Bar 34 is attached to rails 38 and 40 by pin 42. Bar 34 is allowed to pivot around pin 42 and is forced to pivot toward the interior of housing 10 upon engagement of cam 44 therewith. Bars 30 and 32 are mounted and operated with respect to sidewall 12 in a similar fashion to bars 34 and 36. In FIG. 1, bars 30, 32, 34 and 36 are shown disposed toward the interior of housing 10 due to the positions of cam 44 and similar cams which cannot be seen on this view. Wheels 50, 52 and 54 are selectively driven in a counter-clockwise direction while wheels 51, 53 and 55 are driven in a clockwise direction, cooperatively with wheels 50, 52 and 54. Wheels 51, 53, 55, 50, 52 and 54 are all substantially deflectable and resilient at their outer surfaces, and as shown, comprise rubber or neoprene tires mounted on rigid rims.

Cam 44 is fixed to axle 46 which passes through wheels 50, 52 and 54, and is retained to housing 10 by bracket 47. Axle 46 is fixed to wheels 50, 52 and 54, at their centers, and rotates wheels 50, 52 and 54 with cam 44, and is driven by motor 56. The arrangement of this drive is discussed below in connection with FIG. 5.

Bar 36 is pivotally attached to rails 39 and 41 at pin 43 and therefore to sidewall 14, in similar arrangement to the attachment of bar 34 to sidewall 14. A second cam substantially identical to cam 44 is provided on the portion of axle 46 at the opposing end of wheels 50, 52 and 54, to engage bar 36 when rotated. Frame 58 is mounted to sidewall 14 and adjoins rails 40 and 39, and is provided for attachment to shield 60 (shown partially cut away) thereto. Shield 60 is provided to protect operators and bystanders from contact with moving parts.

A pallet 62 is shown in dashed lines, resting on base 64 of invention 2, in position to be thrust from housing 10 by ram 66. Ram 66 retracts into ram enclosure 68 when not actuated. Motor 56 is mounted upon gear box 70 adjacent drive shield 72. Control unit 74 receives signals through signal transmission line 76 from switch box 78. Switch 80 is provided for actuation of motor 56 while switch 82 is provided to actuate ram 66. The location of switches 80 and 82 is not critical to operation of invention 2, and in use, switches 80 and 82 will be conveniently located for the expected user.

Figure 2:
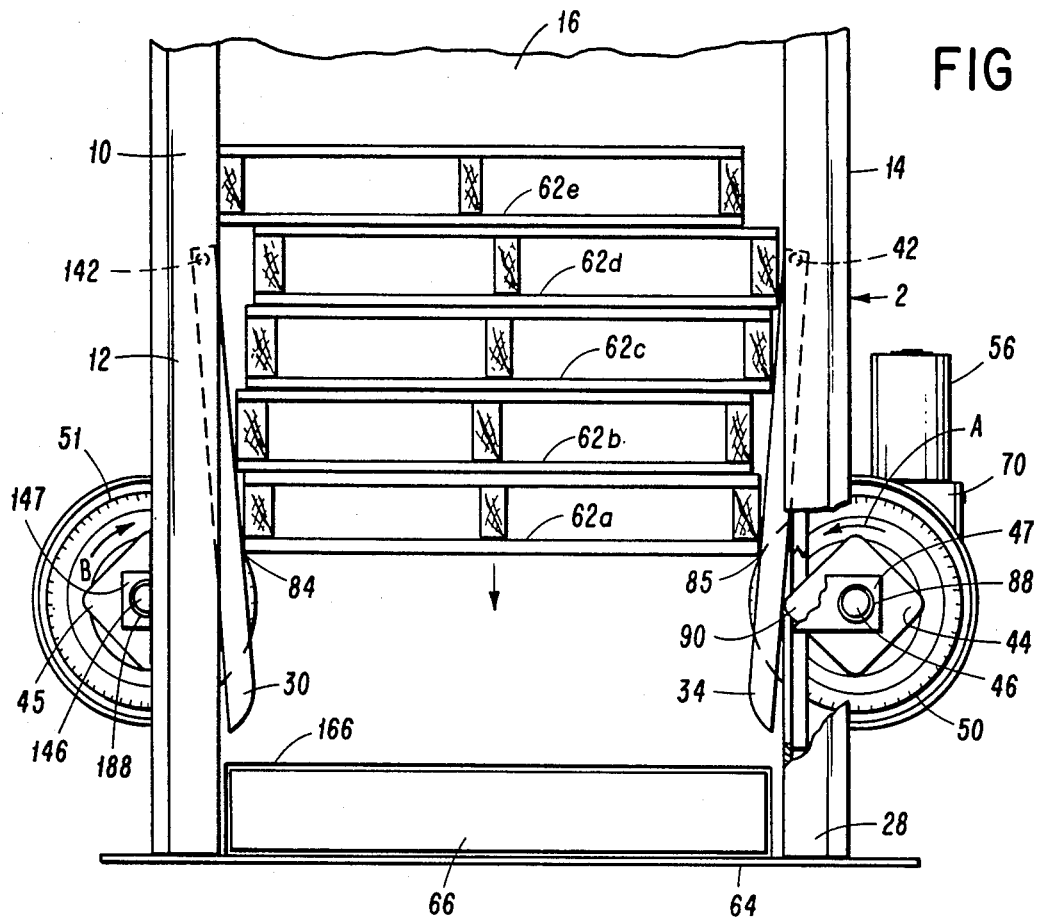
FIG. 2 is a front elevation of the invention, partially cut away, showing the position of initially loaded pallets and showing the straightening bars in their straightening position.
Figure 3:
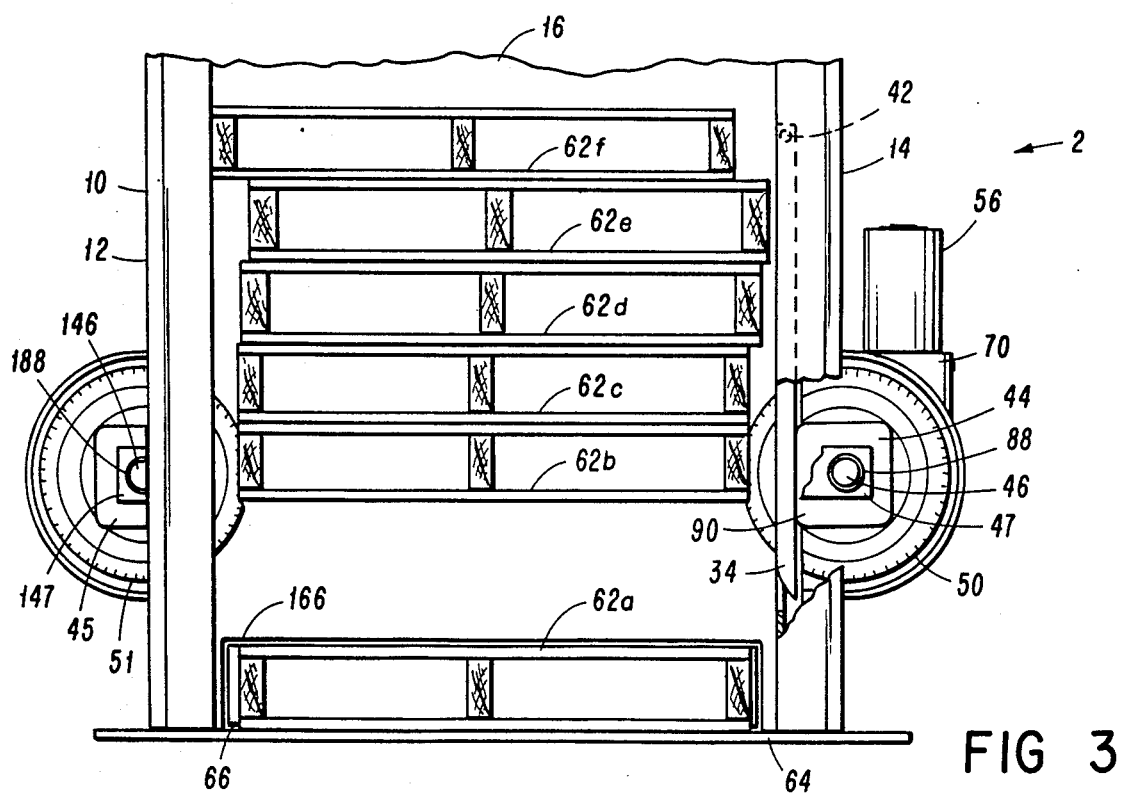
FIG. 3 is a front elevation of the invention, partially cut away, showing pallets in the normal loading state with the straightening bars in relaxed position.

FIGS. 2 and 3 depict the details of the invention 2. FIG. 2 depicts the invention 2 at rest following insertion of pallets 62 therewithin. FIG. 3 shows the invention 2 after one pallet 62a has been dropped to base 64. Referring to both FIGS. 2 and 3, guide 28 of sidewall 14 is partially cut away to reveal the detail of cam 44, bracket 47, axle 46, bearing 88 and wheel 50. Bracket 47 retains bearing 88 through which passes axle 46. Cam 44 is fixed to axle 46, as is wheel 50 such that the angular rotation of cam 44 is equal to the angular rotation of wheel 50 at all times. Bar 34 is retained to sidewall 14 at pin 42 and may pivot toward the interior of housing 10.

Similarly, bar 30 is retained to sidewall 12 by pin 142 and may pivot toward the interior of housing 10, in diametrically opposed fashion to bar 34. Also associated with sidewall 12 is wheel 51 which rotates with axle 146 and with cam 45 which is fixed to axle 146. Axle 146 passes through bearing 188 and bracket 147 which is mounted to sidewall 12. Wheels 50 and 51 are operated in concert, in opposing directions of rotation. Wheel 51 rotates clockwise as viewed from the front of invention 2, and as shown by the direction of arrow B, while wheel 50 rotates counter-clockwise as shown by arrow A. Motor 56 and gear box 70 are mounted to housing 10 toward the rear of said housing 10. Referring now particularly to FIG. 2, lowermost pallet 62a rests at its lower corners 84 and 85 on wheels 51 and 50. Cam 44 engages bar 34 at high point 90 of cam 44. Likewise, cam 45 engages bar 30. Bars 30 and 34 engage pallet 62a and 62b to effect a centering tendency for pallets 62a and 62b within housing 10, and therefore bars 30 and 34 serve to align pallets 62b over pallet 62a. Such alignment of pallets 62a and 62b serves to enhance the operation of wheels 50 and 51 and selectively dropping pallets to the base of housing 10. In FIG. 2, ram 66 can be recessed into opening 166 of rear sidewall 16.

Now referring to FIG. 3, pallet 62a has been delivered to the base 64 of invention 2 adjacent ram 66 which is recessed into opening 166 of sidewall 16. Wheels 51 and 50 have each been rotated forty-five degrees such that high point 90 of cam 44 no longer engages bar 34 and bar 34 rests in position recessed into side wall 14 and is substantially parallel therewith. Pallet 62a has been passed between wheels 51 and 50 before being released from the frictional grip of wheels 50 and 51 and dropping to base 64. Pallet 62b is held by frictional contact with wheels 50 and 51. Wheels 50 and 51 are each deflected due to the location of pallet 62b therebetween.

FIG. 4 illustrates use of the ram 66 as part of the operation of invention 2. Ram 66 is driven by arm 102 from ram enclosure 68. Arm 102 reciprocates within compression cylinder 104 upon operator selection. Spring means may be employed to retract arm 102 into cylinder 104. In this FIG. 4, ram 66 has been actuated to discharge pallet 162b from housing 10. Pallet 162b in turn has pushed pallet 162a toward pallet truck 106. Ram 66 may be maintained in its actuated position while pallet truck 106 is operated in direction of arrow C to insert forks 108 of pallet truck 106 into pallets 162a and 162b. An operator of pallet truck 106 may remain on seat 110 of pallet truck 106, retaining control of tongue 112 while pallets 162a and 162b are delivered by invention 2 for collection by pallet truck 106.

Guide 28 of sidewall 14 of housing 10 can be viewed in FIG. 4. Shield 60 is mounted to sidewall 14 to cover moving parts. Motor 56 is shown mounted atop gear box 70. Drive gear 120 depends from gear box 70 and is covered by drive shield 72. Fluid coupling 12 receives working fluid and redirects it through hoses 124 and 125 to fitting mount 126 of compression cylinder 104. In the preferred embodiment, the working fluid employed is compressed air which is chosen for its rapid transfer capabilities.

FIG. 5 discloses details of the rear drive area of the invention 2. Motor 56 drives drive gear 120 which is interconnected to first sprocket 130 and second sprocket 132 by continuous chain 134. Due to the arrangements of chain 134, first sprocket 130 is driven in opposing direction to that of second sprocket 132. First sprocket 130 is fixed to axle 46 while second sprocket 132 is fixed to axle 146. Idler 136 is provided to tension chain 134. Fluid coupling 122 is mounted to drive shield 72. Fittings 138 and 140 are mounted to fitting mount 126 of compression cylinder 104.

Figure 6:
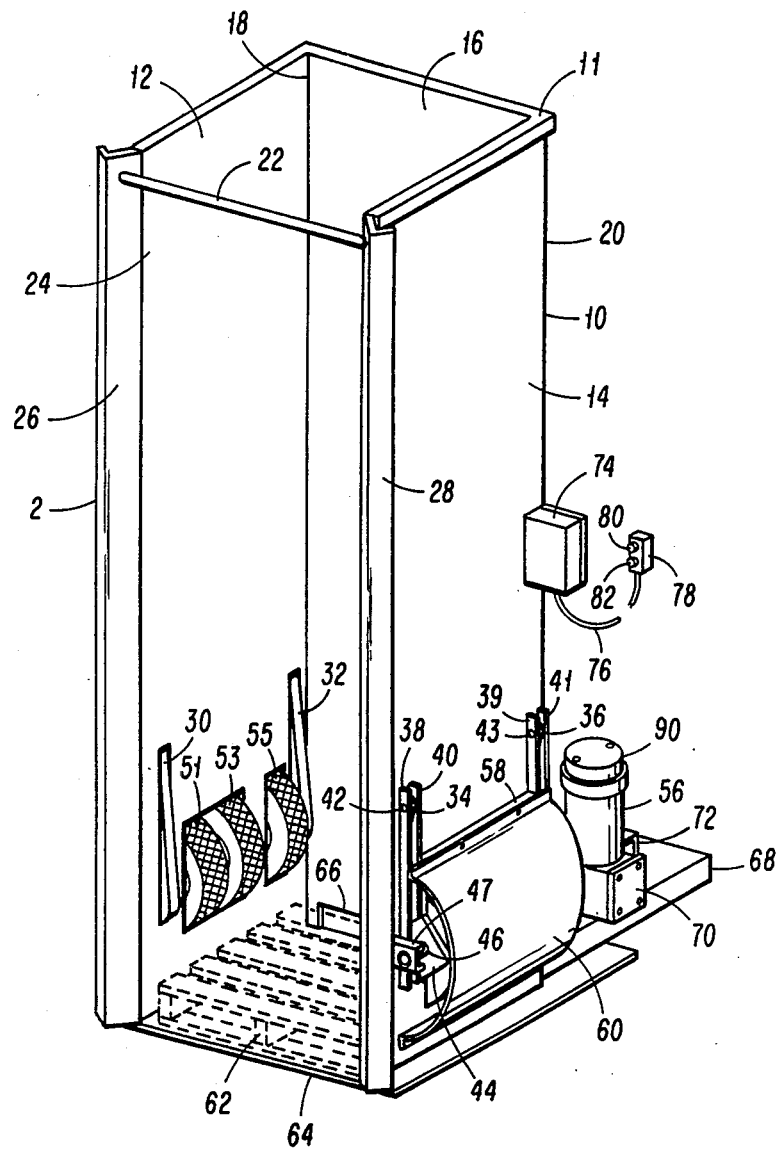
FIG. 6 is a perspective view of an alternative embodiment of the invention.

FIG. 6 discloses the invention with an additional functional element. In FIG. 6, housing 10 is a vertical enclosure with an opening provided to receive pallets. In this embodiment, the opening is provided in housing 10 by excluding one wall. Housing 10 is generally symmetrical. Opposing sidewalls 12 and 14 join rear sidewall 16 at corners 18 and 20 respectively. Support 22 is provided to stabilize sidewalls 12 and 14. Cover 11 rests atop sidewalls 12 and 14, and atop rear sidewall 16. Opening 24 is sufficiently large so that housing 10 may receive pallets, or stacks thereof, in horizontally arranged fashion. Sidewalls 12 and 14 are equipped with guides 26 and 28 respectively, at opening 24. Guides 26 and 28 comprise angled extensions of sidewalls 12 and 14 respectively, and serve to engage any pallets in a stack of pallets being inserted into housing 10 which are not in general alignment with the stack to force them into alignment. Rails 38 and 40 are fixed to sidewall 14. Bar 34 is attached to rails 38 and 40 by pin 42. Bar 34 is allowed to pivot around pin 42 and is forced to pivot toward the interior of housing 10 upon engagement of cam 44 therewith. Similarly, bar 36 pivots at pin 43, between rails 39 and 41, and is introduced into housing 10 by a cam substantially identical to cam 44 but hidden by shield 60. Bars 30 and 32 are mounted and operated with respect to sidewall 12 in a similar fashion to the operation of bars 34 and 36. In FIG. 6, bar 30, 32, 34 and 36 are shown disposed toward the interior of housing 10 due to the positions of cam 44 and similar cams which cannot be seen on this view. Bars 30, 32, 34 and 36 operate concertedly in a centering action upon pallets encountering wheels 51, 53, and 55. Wheels 51, 53 and 55 are driven in a clockwise direction, cooperatively with opposing wheels which are hidden from view by shield 60. Wheels 51 and 53 are located adjacent each other while wheel 55 is spaced a fixed distance from wheel 53. Wheels 51 and 55 are spaced apart slightly less than the front to back depth of a pallet. The counterparts to wheels 51, 53 and 55, which are hidden by shield 60, are arranged in opposing fashion, generally mirroring wheels 51, 53 and 55. Wheels 51, 53 and 55, and those beneath shield 60 are all substantially deflectable and resilient at their outer surfaces, and as shown, comprise rubber or neoprene tires mounted on rigid rims.

The spacing between the outside edge of wheel 51 and its counterpart (shown as wheel 50 in FIG. 1) is less than the width of a pallet to be dispensed. By using resilient wheels, the pallet may be forcibly passed between the sets of wheels by forcing deflection of the wheels. A rotation of approximately 45 degrees will move a pallet into position roughly between the axles of the opposing wheels, and a further rotation of approximately 45 degrees will pass the pallet from between opposing sets of wheels.

Cam 44 is fixed to axle 46 which is retained to housing 10 by bracket 47. The arrangement of this axle is discussed above in connection with FIGS. 1 and 5.

Frame 58 is mounted to sidewall 14 and adjoins rails 40 and 39, and is provided for attachment to shield 60. Shield 60 is provided to protect operators and bystanders from contact with moving parts.

A pallet 62 is shown in dashed lines, resting on base 64 of invention 2, in position to be thrust from housing 10 by ram 66. Ram 66 retracts into ram enclosure 68 when no actuated. Motor 56 is mounted upon gear box 70 adjacent drive shield 72. Control unit 74 receives signals through signal transmission line 76 from switch box 78. Switch 80 is provided for actuation of motor 56 while switch 82 is provided to actuate ram 66. Control unit 74 translates an actuation of switch 80 into a limited operation of the motor 56 to provide an approximate rotation of 45 degrees of cam 44 and wheels 51, 53, and 55. In practice, switches 80 and 82 will be conveniently located for the expected pallet truck driver to operate without dismounting from the pallet truck.

Brake assembly 90 is mounted axially to motor 56 and operates thereupon. When motor 56 is energized by operation of switch 80, brake 90 is disengaged until it becomes engaged to stop motor 56 following the incremental rotation of motor 56 which is caused through operation of switch 80. Brake 90 serves to curtail motor 56 from coasting rotational motion after electricity is no longer supplied to motor 56. Brake 90 therefore serves to prevent wheels 51, 53, and 55, and their counterparts upon sidewall 14, from rotating except when motor 56 is energized. Any rotation of wheels 51, 53, 55, or their counterparts hidden by shield 60, might permit passage of a pallet 62 to base 64 other than when switch 80 is actuated. As that is generally undesirable, brake 90 is provided to prevent coast of the motor and therefore unintentional dropping of a pallet.

OPERATION OF THE INVENTION

In typical operation of invention 2, a stack of pallets is collected by the forks of a forklift truck and raised to a level about wheels 51, 53, 55, 50, 52 and 54 (as shown in FIG. 1) and inserted into opening 24 of housing 10 and allowed to come to rest upon the upper portions of wheels 50, 51, 52, 53, 54 and 55. Upon operator control, motor 56 is briefly operated to drive chain 134 and thus rotate first sprocket 130 and second sprocket 132, as shown in FIG. 5. Because first sprocket 130 is mounted to axle 46 which passes through and is fixed to wheels 50, 52 and 54 and cam 44, the actuation of motor 56 causes counter-clockwise rotation of wheels 50, 52 and 54 when viewed from opening 24. Simultaneously, chain 134 rotates sprocket 132 which is mounted to axle 146. Because axle 146 passes through and is mounted to wheels 51, 53 and 55, the actuation of motor 56 causes wheels 51, 53 and 55 to rotate in a clockwise direction when viewed from opening 24. The cooperative rotation centrally and downwardly of wheels 50, 51 52, 53, 54 and 55, causes pallets 62 to pass between said wheels, deflecting them and holding pallets 62 in position until they are released from the frictional grasp of wheels 50, 51, 52, 53, 54 and 55 upon sufficient rotation thereof. During the rotation of wheels 50, 51, 52, 53, 54 and 55, bars 30, 32, 34 and 36 are forced outwardly at their lower ends due to the cam action of cams 44 and 45, and like cams on the opposing end of axle 46 and 146. These inward movements of bars 30, 32, 34 and 36 effect centering forces on pallets 62 such that they become aligned in a stack as they approach their engagement by wheels 50, 51, 52, 53, 54 and 55.

Once a pallet 62 has been delivered to the base 64 of invention 2, it may be selectively delivered from housing 10 by ram 66, upon the selection of the operator of invention 2. A pallet truck operator may actuate wheels 50, 51, 52, 53, 54 and 55 to deliver a pallet to the base of invention 2 and may then actuate ram 66 to force the pallet out of housing 10 and onto the forks of the operator's pallet truck. Such activity can be accomplished in a serial fashion until sufficient pallets are delivered by ram 66

I claim:

1. Apparatus for storing and selectively dispensing pallets upon demand of a pallet truck operator, the invention comprising:

a vertically disposed housing capable of containing a stack of generally aligned, horizontally positioned pallets, said housing having opposing sidewalls with an opening therebetween for receiving said stack of pallets and for discharging said pallets, said sidewalls having outwardly angled extensions adjacent to the opening, said extensions being sufficiently non-deflectable to force misaligned pallets in a stack of pallets into general alignment, each of said sidewalls having an axle transversely fixed to the exterior thereof along the vertical length of the sidewall, each of said sidewalls having openings therein adjacent said axle, each of said sidewalls having a plurality of wheels disposed vertically in said openings of said sidewalls and being fixed upon said axle, each of said wheels extending a substantially equal diametric distance into the interior of said housing, each of said plurality of wheels having a resilient surface on the circumference thereof, said pluralities of wheels on said sidewalls being opposingly arranged, the resilient surfaces of opposing wheels being spaced apart a distance less than the width of a pallet, said resilient surfaces being deflectable by a pallet being forcibly passed between said wheels in said sidewalls when said wheels are rotated, each of said plurality of wheels comprising a pair of wheels and a third wheel spaced apart from said pair of wheels, a plurality of planar, generally square cams mounted upon each of said axles and fixed thereto in substantially identical orientation, each of said sidewalls having a pair of generally narrow cam receiving vertical openings therein, said narrow vertical openings being generally aligned with the planes of said cams, a pivoting bar member pivotally movable within each of said narrow vertical openings, said cams selectively engaging said pivoting bar members as said axles are rotated, said bar members being biased to return to substantially vertical alignment when not engaged by said cams, said pivoting bar members being urged inwardly into said housing upon the engagement of said cams with said bar members, said bar members engaging the sides of a pallet positioned above the wheels to center said pallet within said housing, a motor for incrementally driving said axles simultaneously in opposing rotations, said wheels rotating with said axles such that the resilient surfaces thereof rotate downwardly within said housing, a switch to selectively energize said motor, said switch means being accessible to the operator of a pallet truck without departure from said pallet truck.

2. The invention of claim 1 wherein said wheels are pneumatic tires, control means energize said motor a fixed time upon operation of said switch means, said control means energizing said motor for a period to drive said axles in increments of 45 degree rotation, a brake assembly selectively restrains rotation of said motor when said motor is de-energized.

3. Apparatus for dispensing pallets, comprising:

a housing capable of holding pallets in a vertical stack, said housing comprising a pair of substantially parallel, vertically arranged sidewalls, said substantially parallel sidewalls spaced apart a distance sufficient to pass a pallet between said sidewalls, said sidewalls having a plurality of wheels mounted therewithin, each of said wheels having a hub and an outer circumferential surface, said wheels having substantially equal diameters, said wheels mounted vertically to said sidewalls in opposing fashion such that said circumferential surfaces of said wheels protrude into said housing, said wheels mounted to said sidewall such that the distance between the protruding circumferential surfaces of said opposing wheels is less than the width of a pallet to be dispensed, said wheels being sufficiently resilient to resist deflection when the vertical stack of pallets rests upon the circumferential surfaces of said wheels, said wheels being selectively, incrementally, rotatable, said wheels are driven in ganged fashion, said wheels on one of said sidewalls rotate in opposing direction to the rotation of the wheels on the other of said sidewalls, said wheels being sufficiently radially deflectable to pass a pallet between opposing wheels when said wheels are driven, a motor to selectively drive said wheels, a switch to selectively engage said motor means to incrementally rotate said wheels, a plurality of bar members is pivotally attached to said sidewalls, said bar members are substantially vertically positioned, said bar members are attached to said sidewalls in opposing fashion, said bar members are pivotable such that the free ends of said bar members are introduceable into said housing, said bar members are selectively, cooperatively introduced into said housing, said bar members engage the sides of said pallets resting upon said wheels, said bar members engage said resting pallets when introduced into said housing thereby urging said resting pallets into generally centered position over said wheels, cam elements rotatingly cooperate with said wheels,
a cam element is provided for each of said bar members,
said cam elements selectively engage said bar members,
the engagement of said cam elements with said bar members urges said bar members into said housing.

4. Apparatus for dispensing pallets, comprising:
a housing capable of holding pallets in a vertical stack,
said housing comprising a pair of substantially parallel, vertically arranged sidewalls,
said substantially parallel sidewalls spaced apart a distance sufficient to pass a pallet between said sidewalls,
said sidewalls having a plurality of wheels mounted therewithin,
each of said wheels having a hub and an outer circumferential surface,
said wheels having substantially equal diameters,
said wheels mounted vertically to said sidewalls in opposing fashion such that said circumferential surfaces of said wheels protrude into said housing,
said wheels mounted to said sidewall such that the distance between the protruding circumferential surfaces of said opposing wheels is less than the width of a pallet to be dispensed,
said wheels being sufficiently resilient to resist deflection when the vertical stack of pallets rests upon the circumferential surfaces of said wheels,
said wheels being selectively, incrementally, rotatable,
said wheels are driven in ganged fashion,
said wheels on one of said sidewalls rotate in opposing direction to the rotation of the wheels on the other of said sidewalls,
said wheels being sufficiently radially deflectable to pass a pallet between opposing wheels when said wheels are driven,
a motor to selectively drive said wheels,
a switch to selectively engage said motor means to incrementally rotate said wheels,
openings in said housing are provided to receive and discharge said pallets,
said receiving opening comprises the opening between said sidewalls,
said sidewalls have outwardly angled extensions thereon adjacent to the pallet receiving opening,
said wheels are incrementally rotatable in approximately 45 degree increments of rotation,
each of said pluralities of wheels mounted to said sidewalls comprises a pair of wheels positioned apart a distance slightly less than the depth of a pallet and a third wheel positioned adjacent to one of the pair of wheels,
said plurality of wheels on one of said sidewalls mirroring the plurality of wheels on the opposing sidewall,
a plurality of bar members is pivotally attached to said sidewalls,
said bar members are substantially vertically positioned,
said bar members are attached to said sidewalls in opposing fashion,
said bar members are pivotable such that the free ends of said bar members are introduceable into said housing,
said bar members are selectively, cooperatively introduced into said housing,
said bar members engage the sides of said pallets resting upon said wheels,
said bar members engage said resting pallets when introduced into said housing thereby urging said resting pallets into generally centered position over said wheels,
cam elements rotatingly cooperate with said wheels,
a cam element is provided for each of said bar members,
said cam elements selectively engage said bar members,
the engagement of said cam elements with said bar members urges said bar members into said housing.

5. Apparatus for storing pallets in a vertical stack and dispensing single pallets from the bottom of the stack, the invention comprising:
an elongated vertical housing,
said housing having a pair of sidewalls and a rear wall,
said sidewalls substantially parallel and spaced apart a fixed distance,
a pair of axles mounted to the exterior of said housing,
one of said axles mounted to each of said parallel sidewalls, transversely, along the width of said sidewalls,
one or more openings in each of said sidewalls, adjacent the axle mounted to said sidewall,
a plurality of wheels fixed at the hubs thereof upon each of said axles,
a portion of each of said wheels protruding through said openings in said sidewalls,
said axles ganged together and cooperatively driven,
said axles being driven in opposing directions,
said wheels on one axle oppose the wheels on the other axle,
said wheels having outer circumferences thereon,
said outer circumferences engaging the lower edges of said stack of ppllets,
said wheels having resilient surfaces which are deflectable in a radial direction when pallets pass between said wheels,
said wheels being selectively, incrementally driven,
a motor for selectively driving said axles,
a switch for selectively engaging said motor means to incrementally rotate said wheels,
control means to limit duration of operation of said motor when selectively engaged by said switch,
each of said sidewalls has a plurality of bar members attached thereto,
said bar members are fixed to said sidewalls in vertical arrangement,
said bar members are fixed at the upper ends thereof to said sidewalls,
each bar member has a free end opposite the end fixed to said sidewall,
said bar members are arranged in opposing pairs,
said bar members pivot about the upper ends thereof,
said free ends of said bar members are selectively introduced into said housing,
said pair of bar members operate cooperatively,
said bar members engage the sides of said pallets within said stack of pallets when said bar members are introduced into said housing,
said bar members are positioned adjacent said wheels,
cam elements are fixed to said axles,
said cam elements selectively engage said bar members,
said cam elements introduce said bar members into said housing when said cam elements engage said bar members.

* * * * *